No. 693,842. Patented Feb. 25, 1902.
M. A. DEES.
PRICE SCALE.
(Application filed Oct. 29, 1900.)
(No Model.) 9 Sheets—Sheet 1.

No. 693,842. Patented Feb. 25, 1902.
M. A. DEES.
PRICE SCALE.
(Application filed Oct. 29, 1900.)

(No Model.) 9 Sheets—Sheet 2.

WITNESSES:

INVENTOR
Mark A. Dees,
BY
ATTORNEYS.

No. 693,842. Patented Feb. 25, 1902.
M. A. DEES.
PRICE SCALE.
(Application filed Oct. 29, 1900.)
(No Model.) 9 Sheets—Sheet 3.

WITNESSES:
M. S. Bloudel
Leonard Huntess Dyer

INVENTOR
Mark A. Dees,
BY
ATTORNEYS.

No. 693,842. Patented Feb. 25, 1902.
M. A. DEES.
PRICE SCALE.
(Application filed Oct. 29, 1900.)
(No Model.) 9 Sheets—Sheet 4.

No. 693,842. Patented Feb. 25, 1902.
M. A. DEES.
PRICE SCALE.
(Application filed Oct. 29, 1900.)
(No Model.) 9 Sheets—Sheet 5.

WITNESSES:

INVENTOR

BY
ATTORNEYS.

No. 693,842. Patented Feb. 25, 1902.
M. A. DEES.
PRICE SCALE.
(Application filed Oct. 29, 1900.)

(No Model.) 9 Sheets—Sheet 6.

Fig. 11.

WITNESSES: INVENTOR
Mark A. Dees,
BY
ATTORNEYS.

No. 693,842.

M. A. DEES.
PRICE SCALE.
(Application filed Oct. 29, 1900.)

Patented Feb. 25, 1902.

(No Model.)

No. 693,842. Patented Feb. 25, 1902.
M. A. DEES.
PRICE SCALE.
(Application filed Oct. 29, 1900.)

(No Model.) 9 Sheets—Sheet 8.

Fig. 13.

WITNESSES:

INVENTOR
Mark A. Dees,
BY
ATTORNEYS.

No. 693,842. Patented Feb. 25, 1902.
M. A. DEES.
PRICE SCALE.
(Application filed Oct. 29, 1900.)

(No Model.) 9 Sheets—Sheet 9.

Fig. 74.

UNITED STATES PATENT OFFICE.

MARK A. DEES, OF MOSSPOINT, MISSISSIPPI.

PRICE-SCALE.

SPECIFICATION forming part of Letters Patent No. 693,842, dated February 25, 1902.

Application filed October 29, 1900. Serial No. 34,793. (No model.)

*To all whom it may concern:*

Be it known that I, MARK A. DEES, a citizen of the United States, residing at Mosspoint, in the county of Jackson and State of Mississippi, have invented certain new and useful Improvements in Computing-Scales; and I do hereby declare the following to be a full, clear, and exact description of the invention, which will enable others skilled in the art to which it appertains to make and use the same.

My invention relates to improvements in computing-scales of that variety in which the value of the thing being weighed is shown upon the surface of a cylinder carried upon an axis parallel to the scale-beam and means are employed for automatically indicating the exact value of the article being weighed without the necessity of adding or subtracting on the part of the operator.

In my invention I employ a plurality of cylinders carried upon parallel axes and arranged to be successively moved to a position adjacent to the scale-beam. The several axes are carried upon a frame pivoted to a central shaft, the frame being adapted to be rotated to successively bring the cylinders in proximity to the scale-beam. The surfaces of the several cylinders carry printed thereon designations of the value of the articles being weighed, the different cylinders being used for articles of different weights. The usual counterpoise or poise is employed and means provided for adjusting it from a fixed point. This means is combined with mechanism for simultaneously rotating a particular one of the several cylinders as the counterpoise is moved along the scale-beam. I prefer to use four cylinders, which are carried upon heads or a frame fixed to a revoluble axle parallel to the scale-beam. These cylinders are so arranged that upon the frame being rotated the cylinders may be successively brought to a position near the scale-beam. A crank-shaft journaled in the scale-frame and carrying a gear which engages with a rack to which is pivoted a pitman provides means for adjusting the poise. The crank-shaft also carries a bevel-pinion, which may engage with a bevel-gear on any of the cylinders. The cylinders are preferably so proportioned as to be of a circumference equal to the working length of the scale-beam. The adjusting mechanism is so proportioned as to move the poise and rotate the cylinder at the same rate of speed. A fixed scale or ribbon is arranged above the scale-beam adjacent to the face of the cylinder that is at the time being in engagement with the adjusting mechanism. This ribbon bears a list of designations of the selling-price per pound of the article being weighed. The surface of the cylinder bears printed thereon in horizontal columns the totals or sums of the weights at different prices. The cylinder rotating at the same speed as that of the poise will indicate the value of an article weighing as much as is indicated by the position of the poise. The total will appear upon the cylinder adjacent to the designation of the price per pound on the fixed scale. The several cylinders are arranged to be used with different counterweights upon the scale-beam. When so used, the cylinder-carrying frame is given a partial rotation to bring the desired cylinder adjacent to the scale-beam. If desired, each cylinder may be incased in a metal cover with a slit or opening adjacent to the scale-beam, or the four cylinders may all be covered by one large metallic casing having an opening near each cylinder. If a single large cylindrical casing be employed, a separate fixed scale will be attached to the periphery thereof adjacent to each opening. The large casing may carry upon its periphery printed designations of the sums total of articles of greater weight than can be indicated by the smaller cylinders. In this case the casing will act upon the same principle as each of the cylinders. Mechanical connections may be made between the poise and the casing; but I prefer in practice to dispense with such connections and rotate the casing by direct independent means. The casing should carry in vertical-column arrangement adjacent to one edge designations of weights with the sums total at different prices on the same horizontal plane. A fixed scale of prices per pound should also be provided, as in the case of the smaller cylinders.

In order to better understand the nature of this invention, attention is called to the accompanying drawings, in which—

Figs. 12 and 13 represent the chart which covers the outside casing. Fig. 14 is the fixed scale used in connection with said casing.

In order to make the description more intelligible, a scale of definite size and capacity will be described, although, of course, it is understood that my invention may be applied to scales weighing materials of any amount and cost. The scale of the size to be described may be used upon the counter, as in the retailing of groceries, &c. It is assumed that computations be made from an ounce up to as high as two hundred and seventy-eight pounds and that it will compute at prices from two cents to eighty cents a pound, so that, say, flour and other relatively cheap articles may be weighed, as well as tea and other relatively high-priced articles. In order to increase the capacity of the scale as much as possible, I prefer to use one employing an upper and a lower platform which will weigh about six and twenty-four pounds, respectively, without the addition of counterweights.

Figure 1:
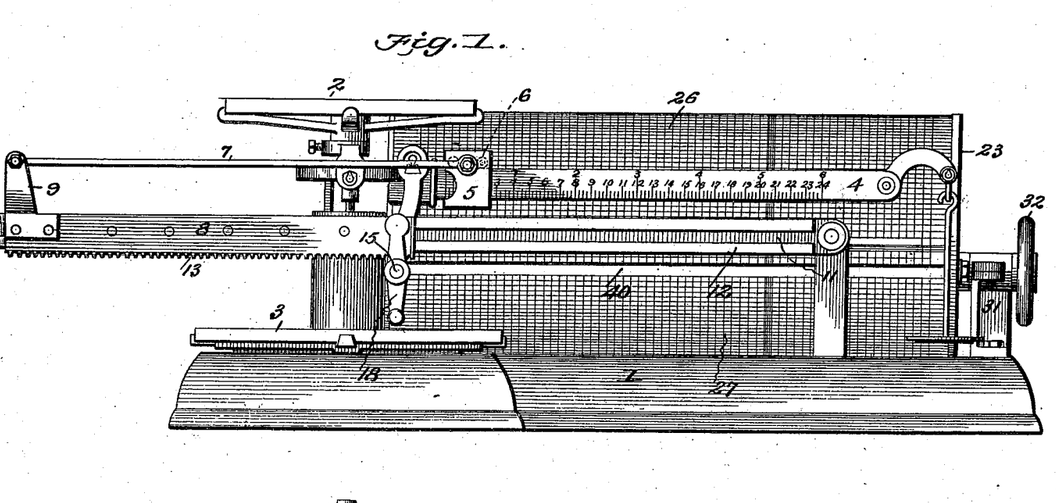
Figure 1 is a front view of the scale.
Figure 2:
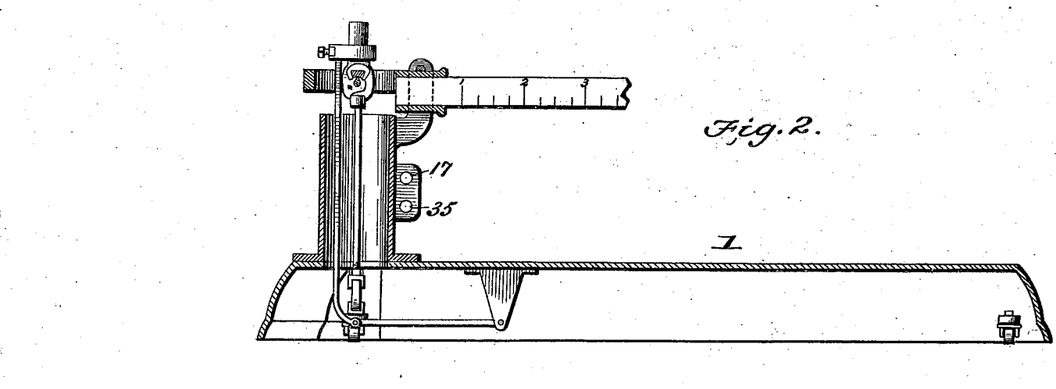
Fig. 2 is a section thereof.
Figure 8:
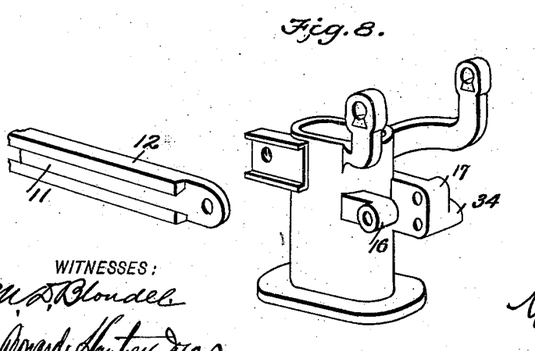
Fig. 8 is a perspective view of the scale-standard.
Figure 9:
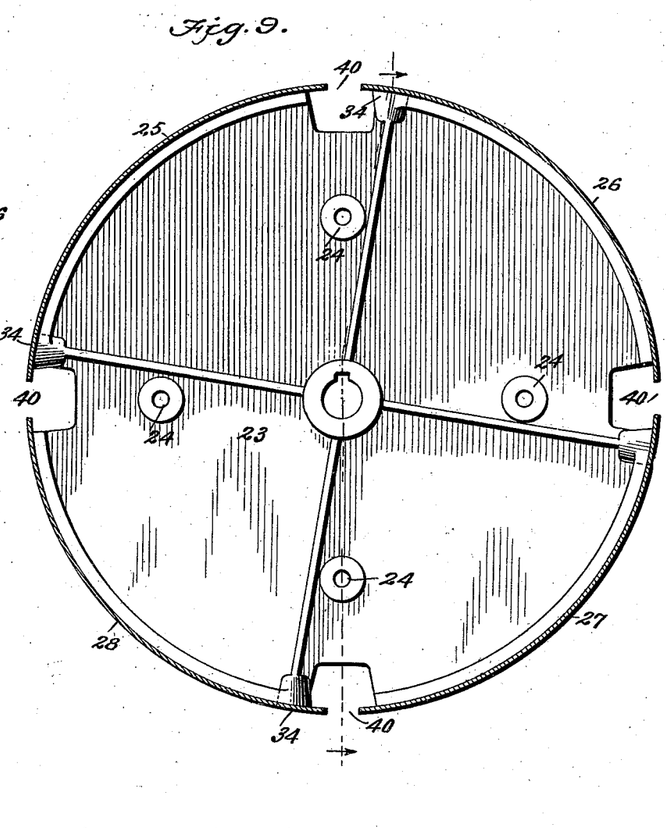
Fig. 9 is a sectional view of one of the cylindrical casing-heads.
Figure 10:
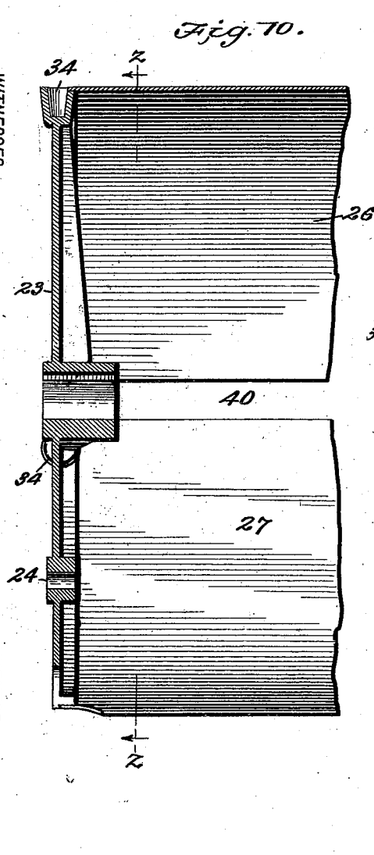
Fig. 10 is a sectional view thereof, taken on the line $z\,z$.

The scale is of the ordinary form, having a base or foundation 1, with the usual upper and lower platforms 2 and 3 and the scale-beam 4. The poise 5 is preferably provided with friction-rollers 6. (Shown in broken lines in Fig. 1.) This poise is adapted to be adjusted from a fixed point. This adjustment is accomplished in the following manner: A pitman 7 is loosely pivoted to the poise and connects with a movable rack-bar 8 by means of an upright arm 9. This rack-bar has a dovetailed portion 10, which engages within a similarly-shaped runway 11 of a fixed slide 12. This slide is supported between the standard, Fig. 8, of the scale and a short pillar 12'. The bottom of the rack-bar 8 is formed as a toothed rack 13, which engages with a pinion 14, carried by a short shaft 15. The latter is mounted in bearings 16 17, formed within lugs, as shown in Fig. 8. A suitable crank 18, properly balanced, as shown, is used to rotate the pinion 14 and slide the rack-bar 8 and with it the pitman and poise. So much of the invention thus described forms an operative entirety and may be used without the computing attachment about to be explained. It may also be used with any other form of attachment desired.

Figures 5, 7:
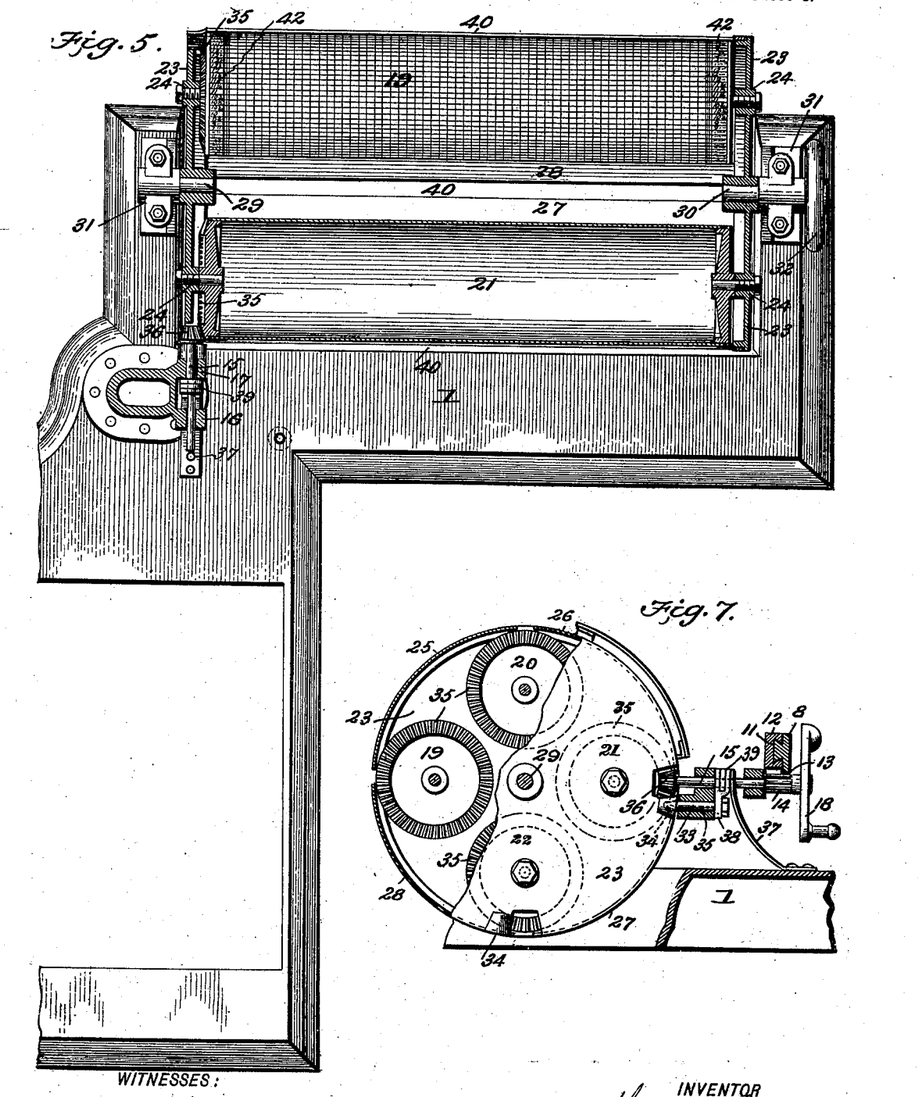
Fig. 5 is a horizontal sectional view taken on the line $y\,y$ of Fig. 3.
Fig. 7 is a detail section taken on the line $x\,x$ of Fig. 6.

For the purpose of computing values four cylinders 19, 20, 21, and 22 are employed. (See Fig. 7.) These cylinders are of identical size, but are used to compute different amounts and at different prices per pound. They are arranged to be successively brought within a field of view adjacent to a price-scale carried by the cylindrical casing, which will indicate the price per pound. The cylindrical casing comprises heads 23 23, carrying bearings 24, on which the cylinders revolve, the whole being assembled by means of the parti-cylindrical pieces 25 26 27 28, attached to the heads, leaving four slots parallel to the cylinder-shaft. The heads 23 are supported upon the foundation 1 by means of the shafts 29 30, supported in bearings carried upon short columns or standards 31. A shaft 30 carries a hand-wheel 32 for the purpose of rotating the cylindrical casing and with it the smaller incased cylinders. The casing is locked in any of four positions by means of a key 33, which may engage with any of the recesses 34 upon the periphery of one of the heads 23. This key may be conveniently mounted within a bearing $35^a$. The cylinders are revolved in the following manner: It is desired that but one be actuated at a time, which is accomplished by providing each with a bevel-gear 35, one of which may engage with a pinion 36, carried upon one extremity of a horizontal shaft. The shaft 15 may be used for this purpose. Means may be provided for rotating the shaft—as, for instance, the crank 18—and for disengaging the pinion. For the latter purpose the shaft may be moved bodily in its bearings. To keep the gears in engagement, a spring 37 may be used engaging with a lug 38 and a collar 39. The key 33 may be connected to and be moved by the lug 38, and the cylinder can then be released simultaneously with the disengaging of the gears. In order to keep the teeth of the rack-bar 8 constantly in engagement with the pinion 14, the face of the latter is made broad.

From the above description it will be seen that upon the crank 18 being rotated one of the cylinders will be turned and the poise simultaneously caused to travel along the scale-beam. The parts are so proportioned and connected that the cylinder will make one complete revolution, and the poise will travel the working length of the scale-beam simultaneously.

In order to indicate the value of the article being weighed, it is necessary to use a fixed scale indicating the price per pound. This scale is located adjacent to a portion of the cylinder that is at the time visible. The dividing-slots between the plates 25 26 27 28 serve this purpose, and but a portion of the periphery of only one cylinder will be visible to the operator. This will be of the cylinder whose bevel-gear will be engaged with the actuating-pinion.

Figure 11:
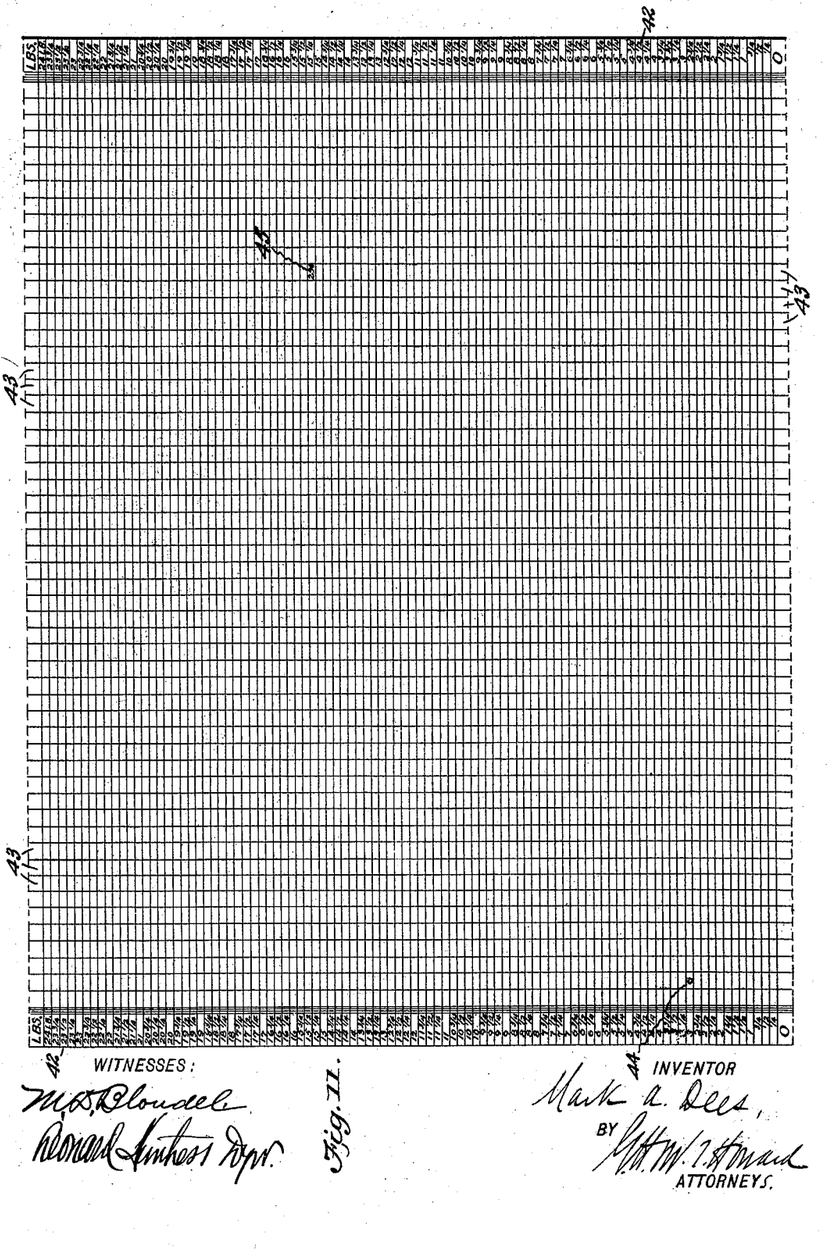
Fig. 11 shows a chart applied to the surface of one of the inner cylinders.
Figure 12:
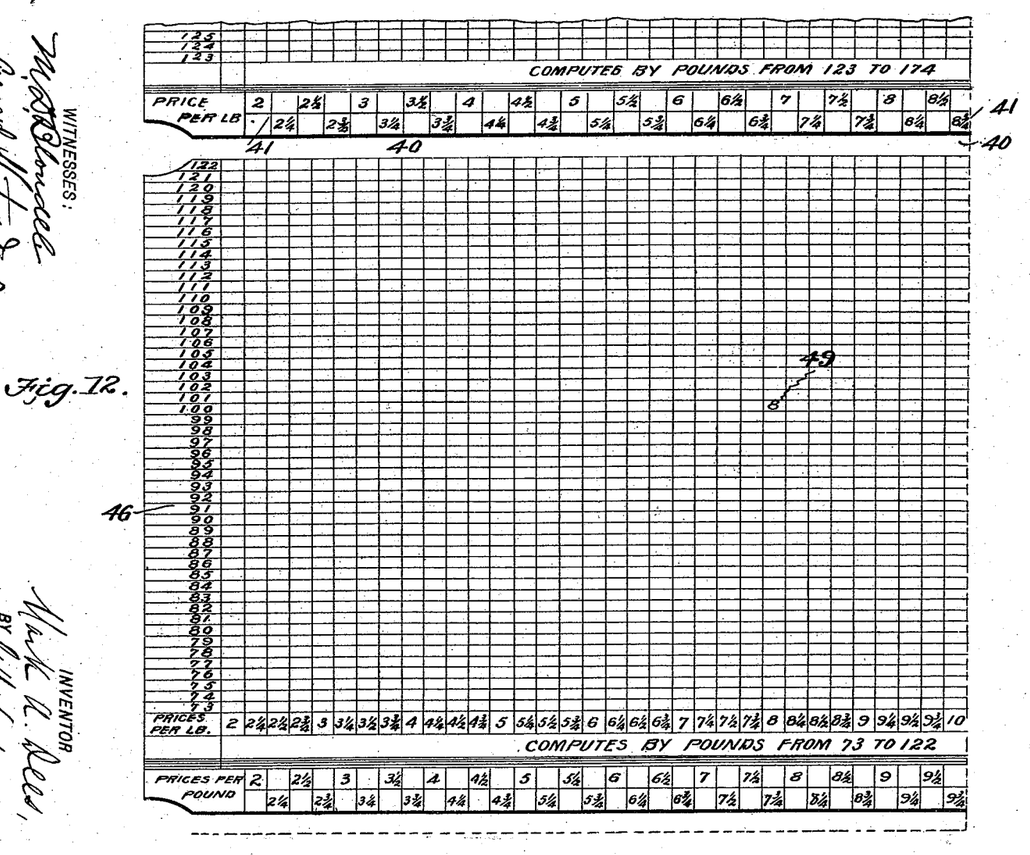

In order to better understand how the different computations are carried out, attention is to be directed to Figs. 11, 12, and 13. The first of these represents the chart which covers the cylinder 20. This is the "second" cylinder, as I so designate it, and is supposed to weigh from one-quarter of a pound up to twenty-four pounds and to compute at values of from two cents to forty cents a pound. The other three charts for the other cylinders, which are not illustrated, but work upon the same principle, are used to weigh from an ounce to six pounds at values from two cents to eighty cents a pound on the first cylinder, and from twenty-four pounds to forty-eight pounds, and from forty-eight pounds to seventy-two pounds, respectively, on the third and fourth cylinders, both at values from two cents to forty cents a pound.

The second cylinder, about to be described, is to be viewed through its appropriate slot 40, formed within the outside casing. Immediately above the slot in horizontal arrangement is printed the price per pound, as from two cents to forty cents. These will be directly over corresponding values upon that portion of the cylinder which appears through the slot. This second cylinder is covered with a chart. (Shown in Fig. 11.) This has printed upon each edge thereof, as at 42, a column of pounds divided into quarters. Parallel vertical columns 43 divide the chart into as many spaces as there are designations upon the scale 41, fixed to the periphery of the casing, one being at each slot 40. (See Fig. 13.) Within these columns are printed numbers which are the products found by multiplying the weight, as indicated in the side columns upon the chart, by the price per pound, as will appear in the corresponding portion of the scale 41. As an example, as shown at 44, opposite to the weight "3" and immediately above the price "2" in the scale 41 appears the figure "6," which indicates the cost at two cents a pound. A further example is shown at 45, which is the result of multiplying fifteen and one-quarter pounds by nineteen cents, or two dollars and ninety cents. It will be seen that these resulting products are so printed in horizontal arrangement opposite to certain weights that when the cylinder is turned so as to cause the weight upon the scale 42 to appear through the slot 40 the sums at the different prices per pound will appear immediately below the scale 41.

The theory of computation of the other three cylinders is identical with that just described, it being understood that but one is brought into operative position at the same time, the others being unemployed. To change from one cylinder to another, the bevel-gear 36 is disengaged from the gear 35 of a cylinder, and simultaneously the key 33 is removed from its engaging notch. The casing is then rotated a partial revolution by means of the hand-wheel 32. When the desired cylinder has been brought to position, the casing is locked and the gears are caused to engage. Owing to the width of the face of the gear 14 it is never out of engagement.

Figure 3:
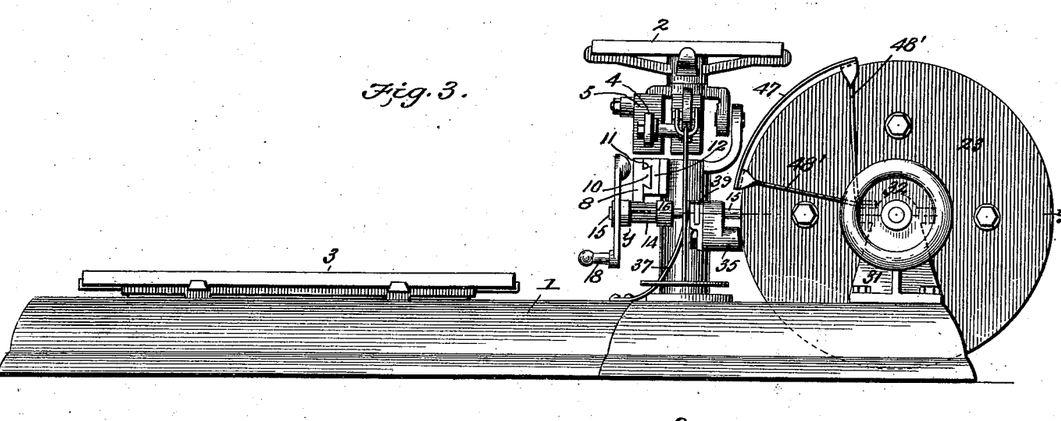
Fig. 3 is a side view.
Figure 4:
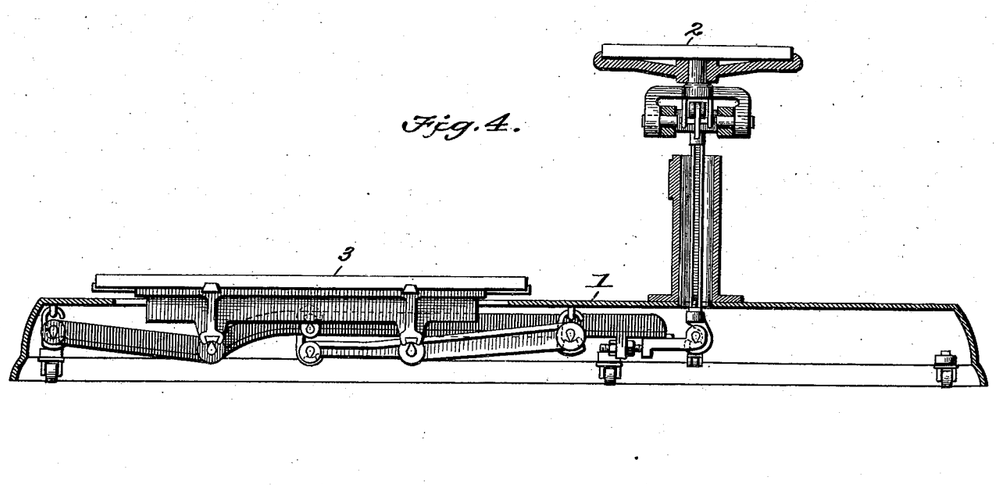
Fig. 4 is a section thereof.
Figure 6:
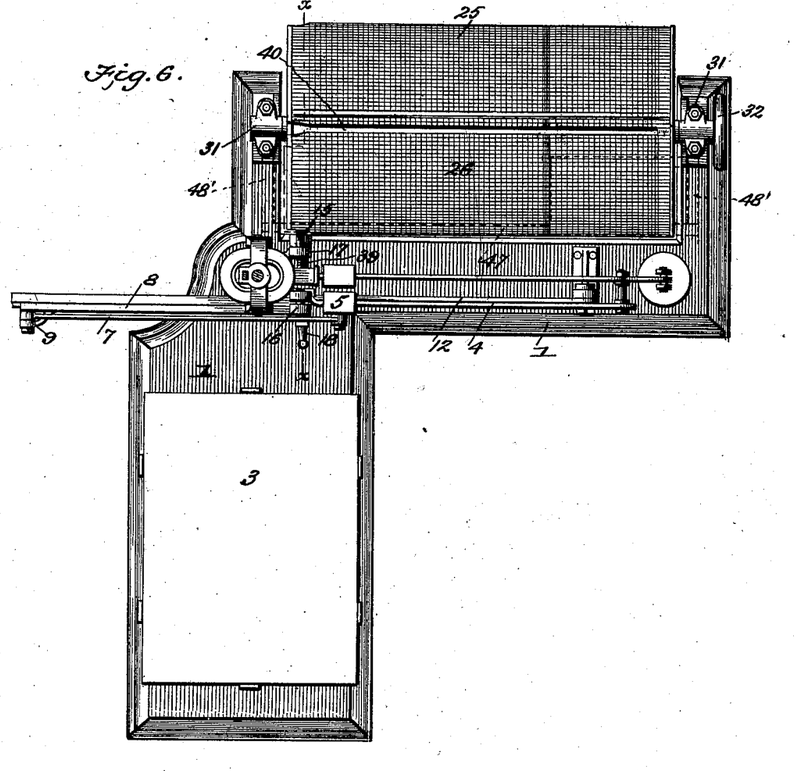
Fig. 6 is a plan view, on a reduced scale, of the device.

To increase the capacity of the scale, the casing which surrounds the cylinders may be employed as a computing-cylinder. For this purpose it is covered with the chart illustrated in Figs. 12 and 13 and is used in connection with the fixed price-scale illustrated in Fig. 14. The chart works upon the same principle as that described in connection with the internal cylinders. As the smaller cylinders compute to seventy-two pounds, this large cylinder is used for computing from seventy-three to two hundred and seventy-eight pounds. For this purpose one edge of the chart is provided with a list of weights from "73" to "278" in one vertical column 46. In connection with this chart a fixed price-scale, as shown in Fig. 14, is employed. This is preferably attached to a sheet-metal backing 47, as shown in Fig. 3 and in broken lines in Fig. 6. It may be attached to the scale-frame by means of the arms 48'. The fixed price-scale is provided with designations of prices per pound in horizontal-column arrangement, as shown at 48. As illustrated, these are from two cents to twenty cents. As arranged in the drawings, this price-per-pound scale would extend from the column of weights 46 to the dividing-line 50. The face of the chart is divided into squares of vertical columns, as many in number as the divisions 48 upon the fixed scale. These columns have printed thereon numbers which are the products found by multiplying the number which happens to be within the column 46 upon the same horizontal plane as that in the same vertical column above the scale 48. As an example, in the square indicated by 49, Fig. 12, appears the number "8." This is the product of the figure "100" found in the column 46 upon the same horizontal plane as that within the vertical column above the figure "8." (This will be understood to indicate eight hundred cents, or eight dollars.) It will be seen that by turning the casing upon its axle until a number or weight of the column 46 appears immediately over the portion 48 of the fixed scale the product found by multiplying the weight by the price per pound will appear immediately above the corresponding portion of the scale 48. As an example, let it be assumed that a material selling for eight cents a pound is being weighed and that it weighs exactly one hundred pounds. The casing is turned until the figure "100" in the column 46 appears immediately adjacent to the scale 48. Upon the face of the casing and immediately above the figure "8" of the scale at 49 will appear the designation "8," or eight dollars. For the purpose of still further increasing the capacity of the device that portion of the chart surrounding the casing to the right of the dividing-line 49 may be further subdivided. I prefer in practice to have it indicate the following: "Fractions of one dollar's worth," "Thirty-two-pound bushel," "Fifty-six-pound bushel," and "Sixty-pound bushel." In Fig. 13 that portion of the chart illustrated indicates the tabulations for computing fractions of one dollar's worth. At the right-hand edge of the chart is a column 51 of pounds divided horizontally, as from two to eighty-five pounds. The main body of the chart between the column 51 and the line 50 is divided into squares formed by vertical and horizontal lines. These squares correspond to those on the price-scale 52. (See Fig. 14.) The price-scale is divided into fractions of one dollar from "5" to "95." The body of the chart is covered with figures, each of which is determined in the ratio of the weight (which appears in the same horizontal plane in the column 51) to the number that appears in the scale 52 in the same vertical plane. The theory of operation is the same as that described in connection with the rest of the chart, the numbers being viewed through the slot 53. The rest of the chart is devoted to tabulations upon the same principle for computing values of portions of bushels at thirty-two, fifty-six, and sixty pounds each, respectively. These are to be read in connection with the fixed scales 54 55 56, respectively. The price-totals will appear through the slots 57 and 58 and over the upper edge of the scale 56.

While I have here shown what is considered to be a simple, efficient, and easily-operated device, I do not confine myself to the particular mechanisms and constructions herein specifically described; it being evident that many modifications thereof having the same or substantially the same functions may be devised by a skilful mechanic without the exercise of invention, and such minor and unimportant departures from what is herein shown and described not involving invention I claim as fully within the terms of my claims.

Having thus described my invention, I claim—

1. In a scale, the combination of a scale-beam, a poise on said beam, a slidable shaft carrying two gears, a rotatable computing-cylinder, a gear attached to said cylinder and adapted to engage one of the gears on said slidable shaft, a rack adapted to be constantly engaged by the other gear of said slidable shaft, and means for connecting said rack to the poise, substantially as described.

2. In a scale, the combination of a scale-beam, a poise on said beam, a plurality of computing-cylinders each having a gear-wheel, a slidable shaft, two gears mounted on said shaft, one of said gears being adapted to engage and be disengaged from a gear of one of the cylinders, a rack adapted to constantly engage the other gear of said shaft, and means for connecting the rack to the poise, substantially as described.

3. In a scale, the combination of a scale-beam, a poise on said beam, a slidable shaft, a bevel-gear and a spur-gear on said slidable shaft, a computing-cylinder, a bevel-gear attached to said cylinder and adapted to be engaged with and disengaged from the bevel-gear on said slidable shaft, a rack adapted to constantly engage the spur-gear on said shaft, means for connecting the rack to the poise, a slotted casing surrounding said computing-cylinder, and a price-scale on the outside of said casing, substantially as described.

4. In a scale, the combination of a scale-beam, a poise thereon, a slidable shaft, two gears on said shaft, a rack constantly in engagement with one of said gears and connected to said poise, and a cylinder adapted to be operatively connected with and disengaged from the other of said gears, whereby said cylinder and poise may be simultaneously rotated and moved horizontally, respectively, substantially as described.

5. In a scale, the combination of a frame, a scale-beam, a poise, a slidable shaft mounted in the frame so as to move horizontally, two gears on said shaft, one a bevel-pinion and the other a broad-faced spur, a rack constantly coöperating with the latter gear and connected to said poise, and a cylinder adapted to be operatively connected with and disconnected from the bevel-gear of said shaft, substantially as described.

6. In a scale, the combination of a frame, a scale-beam, a poise thereon, a slidable shaft, two gears thereon, a rack constantly coöperating with one of said gears and connected to said poise, and a plurality of cylinders capable of rotation as a series about a common axis and individually upon individual axes, and of individual connection with the other of said gears, whereby either of said cylinders and the poise may be simultaneously actuated, substantially as described.

7. In a scale, the combination of a frame, a scale-beam, a poise adapted to slide thereon, a slidable shaft mounted in horizontal bearings in the frame, a bevel-gear and a broad-faced spur-gear mounted upon said shaft, a rack constantly in engagement with the broad-faced gear and connected to said poise, and a plurality of cylinders rotatably mounted as a series in the frame on a common axis and each capable of independent rotation, and of independent connection with the spur-gear of said shaft, whereby said connected cylinder and the poise may be simultaneously actuated, substantially as described.

8. In a scale, the combination of a scale-beam, a poise adapted to slide thereon, a slidable shaft mounted in the frame, two gears upon said shaft, a rack constantly in engagement with one of said gears and connected to said poise, a rotatable series of computing-cylinders, and a manually-operated rotatable casing mounted on an axis concentric with that of the series of computing-cylinders, whereby any one of said series of cylinders upon the partial rotation of the series may be operatively connected to the bevel-wheel of said shaft and both said cylinder and poise be simultaneously actuated, substantially as described.

9. In a scale, the combination of a scale-beam, a series of computing-cylinders, commonly rotatable as a series, means for rotating one of said cylinders independently of the others, a poise carried by the beam, and means whereby said independently-operated cylinder and the poise may be simultaneously actuated, substantially as described.

10. In a scale, the combination of a frame, a scale-beam, a poise thereon, a plurality of computing-cylinders nested together and revoluble as a series, means for simultaneously adjusting the poise and rotating one of the cylinders independently of the others, a casing surrounding the cylinders having openings or slots to expose said cylinders, and a price-scale adjacent to each opening, substantially as described.

11. In a scale, the combination of a scale-beam, a poise thereon, a plurality of computing-cylinders nested together and commonly revoluble, means for simultaneously adjusting the poise and rotating one of said cylinders independently of the others, a casing surrounding said cylinders having openings or slots, and a price-scale adjacent to each opening of said casing, substantially as described.

12. In a scale, the combination of a scale-beam, a poise on said beam, an adjustable shaft, two gears on said shaft, a plurality of independently-rotating computing-cylinders nested together and adapted to revolve as a series about a common axis, a gear-wheel attached to each of said cylinders and adapted to engage and be disengaged from one of the gears on said shaft, a rack constantly engaging the other gear on said shaft, means for connecting the rack to the poise, a casing surrounding said plurality of computing-cylinders and having openings or slots therein, and a price-scale adjacent to each slot of said casing, substantially as described.

13. In a scale, the combination of a scale-beam, a poise thereon, a plurality of independently-rotatable computing-cylinders nested together each having a bevel-gear attached thereto, said plurality of cylinders being rotatable as a series, a slotted casing surrounding said cylinders, a slidable shaft having a bevel-gear thereon with which the gear of each individual computing-cylinder may be brought into engagement, a broad-faced spur-gear carried by the same shaft, a rack constantly engaging said last-named gear, and a connection between the rack and the poise, substantially as described.

14. In a scale, the combination of a frame, a computing-cylinder, a scale-beam, a poise thereon, a shaft, two gears thereon, a rack, connections between the rack and one of said gears, connections between said cylinder and the other of said gears for simultaneously actuating said poise and cylinder, a casing surrounding said cylinder having an opening or slot therein, and a scale adjacent to the opening of said casing, substantially as described.

15. In a scale, the combination of a frame, a scale-beam, a poise thereon, a shaft, two gears thereon, a rack coöperating with one of said gears and connected to said poise, and a cylinder detached from the scale-beam and mounted in fixed bearings, said cylinder being operatively connected to the other of said gears whereby said cylinder and poise may be simultaneously actuated, substantially as described.

16. In a scale, the combination of a frame, a scale-beam, a poise thereon, a shaft, two gears thereon, a rack coöperating with one of said gears and connected to said poise, and a cylinder releasably connected to the other of said gears, substantially as described.

17. In a scale, the combination of a frame, a scale-beam, a poise thereon, a shaft, two gears thereon, a rack adapted to slide in a fixed frame and coöperating with one of said gears and connected to said poise, and a plurality of cylinders capable of alternate and separable connection with the other of said gears, substantially as described.

18. In a scale, the combination of a computing-cylinder, a scale-beam, a poise thereon, a shaft, two gears thereon, a rack, connections between the rack and one of said gears, connections between said cylinder and the other of said gears for simultaneously actuating said poise and cylinder, a casing surrounding said cylinder having an opening or slot to expose said cylinder, a scale on said casing adjacent to the slot, a computing-chart surrounding said casing, and a fixed scale coacting with said chart, substantially as described.

19. In a scale, the combination of a scale-beam therefor, a poise thereon, a plurality of computing-cylinders nested together, means common to both poise and one of said cylinders for simultaneously actuating both, a casing surrounding said cylinders having openings or slots therein to expose said cylinders, a scale adjacent to each slot, a computing-chart on the outside of said casing, means for rotating said casing, and a fixed scale coacting with said casing, substantially as described.

20. In a scale, the combination of a frame, a scale-beam, a poise thereon, a plurality of computing-cylinders nested together, means carried by the frame for adjusting the poise and rotating one of the cylinders, a casing surrounding the cylinders and having a slot for each cylinder, a scale adjacent to each slot, a surrounding computing-chart on the outside of said casing, and means for rotating said casing, substantially as described.

21. In a scale, a frame, a computing-cylinder, a scale-beam, a poise thereon, a shaft, two gears thereon, a rack, connections between the rack and one of said gears, connections between said cylinder and the other of said gears for simultaneously actuating said poise and cylinder, means for rotating said cylinder, a casing surrounding said cylinder having an opening or slot therein to expose said cylinder, a scale adjacent to said slot, a computing-chart on the outside of said casing, a fixed scale coacting with said casing, and means for rotating said casing, substantially as described.

22. In a scale, the combination of a frame, a scale-beam, a poise thereon, a plurality of computing-cylinders nested together, means common to both the poise and one of said cylinders for simultaneously actuating both, a casing surrounding said cylinders having openings or slots therein to expose said cylinders, a scale adjacent to each of the openings or slots of said casing, a computing-chart on the outside of said casing, a fixed price-scale attached to a backing 47, and means for rotating said casing, substantially as described.

23. A computing-scale having weighing members combined with a series of coacting and rotating computing-cylinders, the first of said series of cylinders having indications thereon beginning at a small unit of weight and at a high rate of price per unit, the intermediate cylinders having thereon indications of higher weights but lower in price, and the last cylinder of said series computing a large number of pounds but at a low price per pound, substantially as set forth.

24. In a computing-scale having upper and lower platforms and weighing members including a beam and a poise thereon, the combination of two disconnected rotating computing-cylinders, one for use with the lower platform and the other with the upper platform, a price-scale adapted for use with each cylinder, and means whereby the poise on said beam and one of said cylinders may be simultaneously moved, substantially as set forth.

25. In a scale, the combination of weighing members including a beam and a poise thereon, with rotary computing mechanism, a rack adapted to slide in a fixed frame parallel with said beam, a connection between the poise and the rack, and a gear operatively connected with said rack whereby the poise and the rotary computing mechanism may be moved simultaneously, substantially as set forth.

In testimony whereof I have hereunto set my hand.

MARK A. DEES.

Witnesses:
N. W. McLEOD,
A. W. STANDING.